US012624276B2

(12) United States Patent
Gonzalez et al.

(10) Patent No.: US 12,624,276 B2
(45) Date of Patent: May 12, 2026

(54) COMPOSITIONS AND METHODS FOR THE DISSOLUTION OF IRON SULFIDE

(71) Applicant: Solugen, Inc., Houston, TX (US)

(72) Inventors: Catherine Gonzalez, Houston, TX (US); Jason Helander, Richmond, TX (US); Jun Su An, Houston, TX (US); Thomas Swanson, Houston, TX (US); Jihye Kim, Sugar Land, TX (US); Kimchi Phan, Houston, TX (US)

(73) Assignee: SOLUGEN, INC., Houston, TX (US)

( * ) Notice: Subject to any disclaimer, the term of this patent is extended or adjusted under 35 U.S.C. 154(b) by 0 days.

(21) Appl. No.: 18/287,874

(22) PCT Filed: Apr. 25, 2022

(86) PCT No.: PCT/US2022/026149
§ 371 (c)(1),
(2) Date: Oct. 21, 2023

(87) PCT Pub. No.: WO2022/226401
PCT Pub. Date: Oct. 27, 2022

(65) Prior Publication Data
US 2024/0368452 A1 Nov. 7, 2024

Related U.S. Application Data

(60) Provisional application No. 63/179,164, filed on Apr. 23, 2021.

(51) Int. Cl.
*C09K 8/532* (2006.01)
(52) U.S. Cl.
CPC .......... *C09K 8/532* (2013.01); *C09K 2208/20* (2013.01)

(58) Field of Classification Search
CPC .......... C09K 8/52; C09K 8/528; C09K 8/532; C09K 2208/20
See application file for complete search history.

(56) References Cited

U.S. PATENT DOCUMENTS 4,218,284 A * 8/1980 Hultman ................ D21C 3/226
162/38
6,926,836 B2 * 8/2005 Fidoe .................. C23F 11/1676
422/15

(Continued)

FOREIGN PATENT DOCUMENTS

WO 2016/155967 A1 10/2016
WO 2021/025957 A1 2/2021
WO 2021/030505 A1 2/2021

OTHER PUBLICATIONS

Nasr-El-Din, H.A et al., "Iron Sulfide Formation in Water Supply Wells With Gas Lift," 2001 SPE International Symposium on Oilfield Chemistry, Houston, Texas, Feb. 13-16, 2001 (SPE 65028) (16 p.).

(Continued)

*Primary Examiner* — Angela M DiTrani Leff
(74) *Attorney, Agent, or Firm* — CONLEY ROSE, P.C.

(57) ABSTRACT

A method of reducing scale on a surface, the method including: contacting (i) one or more biochelants; (ii) one or more organophosphorus compound; (iii) an optional enhancer and (iv) a solvent with the surface having one or more deposits comprising iron sulfide. A composition comprising: (i) a biochelant; (ii) an organophosphorus compound; (iii) an optional enhancer and (iv) a solvent. A method of servicing a wellbore disposed in a subterranean formation including: placing into the wellbore a fluid comprising a biochelant; (ii) an organophosphorus compound; (iii) an optional enhancer; and (iv) a solvent for a time period sufficient to reduce a level of iron sulfide deposits by at least (Continued)

about 10% wherein the optional enhancer comprises an amino alcohol.

19 Claims, 8 Drawing Sheets

(56)                    References Cited

U.S. PATENT DOCUMENTS

| | | | | |
|---|---|---|---|---|
| 8,673,834 | B2 * | 3/2014 | Trahan | C23G 1/26 510/222 |
| 2003/0062316 | A1 * | 4/2003 | Mattox | C09K 8/528 210/700 |
| 2005/0263739 | A1 | 12/2005 | Mattox et al. | |
| 2007/0108127 | A1 * | 5/2007 | Talbot | C23F 14/02 210/639 |
| 2009/0324820 | A1 * | 12/2009 | Chartier | C09D 7/61 106/14.44 |
| 2014/0080792 | A1 * | 3/2014 | Jones | C09K 8/605 514/129 |
| 2014/0251922 | A1 * | 9/2014 | McDaniel | C02F 1/52 423/226 |
| 2015/0038470 | A1 * | 2/2015 | Keasler | A01N 43/50 514/129 |
| 2015/0114653 | A1 * | 4/2015 | Conway | E21B 47/06 166/308.2 |
| 2017/0362492 | A1 * | 12/2017 | Nasreldin Mahmoud | C09K 8/528 |
| 2018/0105732 | A1 * | 4/2018 | Okocha | C02F 5/10 |
| 2018/0148632 | A1 * | 5/2018 | Bennett | C23G 1/088 |
| 2018/0347316 | A1 * | 12/2018 | Peng | C09K 8/532 |
| 2019/0062184 | A1 | 2/2019 | Mantri et al. | |
| 2019/0223434 | A1 * | 7/2019 | Balasubramanian | A01N 43/16 |
| 2020/0087568 | A1 * | 3/2020 | Mahmoud | C09K 8/532 |
| 2022/0017812 | A1 * | 1/2022 | Reyes | C09K 8/528 |
| 2023/0133492 | A1 * | 5/2023 | Mosina | C09K 8/528 507/268 |
| 2025/0075338 | A1 * | 3/2025 | Lu | C23G 1/088 |

OTHER PUBLICATIONS

Ahmed, Musa et al., "Effect of pH on Dissolution of Iron Sulfide Scales Using THPS," e SPE International Conference on Oilfield Chemistry, Galveston, Texas, Apr. 8-9, 2019 (Spe 193573-MS) (9 p.).

DOW: Product Safety Assessment, AQUCAR™ THPS 75 Water Treatment Microbiocide, Jul. 26, 2010 (7 p.).

DOW: Microbial Control, AQUCAR™ THPS 75 Water Treatment Microbiocide Antimicrobial for Industrial Water Treatment Applications , 2010 (4 p.).

Ahmed, Musa et al., "Development of a New Borax-Based Formulation for the Removal of Pyrite Scales," ACS Omega, 2002, vol. 5, pp. 14308-14315 (8 p.).

Williams, Terry M. et al., "The Environmental Fate of Oil and Gas Biocides: A Review," Corrosion, Mar. 9-13, 2014, San Antonio, TX, Paper No. 3876 (15 p.).

United States Environmental Protection Agency New England—Region I One Fact Sheet, Draft National Pollutant Discharge Elimination System (NPDES) Permit To Discharge To Waters of the United States Pursuant To the Clean Water Act (CWA) 2009 (17 p.).

Jew, Adam D. et al., "Impact of Organics and Carbonates on the Oxidation and Precipitation of Iron during Hydraulic Fracturing of Shale," Energy Fuels 2017, vol. 31, No. 4, pp. 3643-3658, Mar. 6, 2017 (42 p.).

Jawish, M.W. et al., "New Formulations for the Control of Iron Sulfide Deposits in Oil Production Facilities," SPE Kingdom of Saudi Arabia Annual Technical Symposium and Exhibition, Dammam, Saudi Arabia, Apr. 23-26, 2018 (SPE-192228-MS) (19 p.).

Ramanathan, Raja et al., "New Insights into the Dissolution of Iron Sulfide Using Chelating Agents," Society of Petroleum Engineers, vol. 25, No. 6, pp. 3145-3159, Dec. 2020 (SPE-202469-PA) (15 p.).

Onawole, Abdulmujeeb T. et al., "Effect of pH on Acidic and Basic Chelating Agents used in the Removal of Iron Sulfide Scales: A Computational Study," Journal of Petroleum Science and Engineering, vol. 178, Jul. 2019, pp. 6499-6654 (6 p.).

Wang, Qiwei et al., "Sour Corrosion Products Formed in High H2S Gas Wells," Corrosion, Nashville, TN, Mar. 2019, Paper No. NACE-2019-12866 (15 p.).

Patel, Dhvanil et al., "Optimization and Thermal Stability of the THPS and NH4Cl Blend to Dissolve Iron Sulfide FeS Scale at HPHT Conditions," Abu Dhabi International Petroleum Exhibition & Conference, Abu Dhabi, UAE, Nov. 11-14, 2019 (SPE-197632-MS) (14 p.).

Ramanathan, Raja et al., "Evaluation of Chelating Agents for Iron Sulfide FeS Scale Removal," Abu Dhabi International Petroleum Exhibition & Conference, Abu Dhabi, UAE, Nov. 11-14, 2019 (SPE-197891-MS) (19 p.).

Lakatos, I. et al., "Potential of Different Polyamino Carboxylic Acids as Barium and Strontium Sulfate Dissolvers," SPE European Formation Damage Conference, Sheveningen, The Netherlands, May 2005 (SPE-94633-MS) (8 p.).

Ramanathan, Raja et al., "A Comparative Experimental Study of Alternative Iron Sulfide Scale Dissolvers in the Presence of Oilfield Conditions and Evaluation of New Synergists to Aminopolycarboxylic Acids," SPE Journal, vol. 26, No. 2, pp. 693-715, Apr. 2021 (SPE-205005-PA) (23 p.).

Ramanathan, Raja et al., "Improving the Dissolution of Iron Sulfide by Blending Chelating Agents and its Synergists," SPE Middle East Oil and Gas Show and Conference, Manama, Bahrain, Mar. 18-21, 2019 (SPE-195128-MS) (19 p.).

Gamal, Hany et al., "New Environmentally Friendly Acid System for Iron Sulfide Scale Removal," Sustainability 2019, vol. 11, No. 6727, Nov. 27, 2019 (13 p.).

Wang, Q. et al., "Laboratory Assessment of Tetrakis(Hydroxymethyl)Phosphonium Sulfate as Dissolver for Scales formed in Sour Gas Wells," International Journal of Corrosion and Scale Inhibition, vol. 4, No. 3, pp. 235-254, Jan. 2015 (20 p.).

Larsen, Jan et al., "Experience With the Use of Tetrakishydroxymethylphosphonium Sulfate (THPS) for the Control of Downhole Hydrogen Sulfide," Corrosion 2000, Orlando, FL, Mar. 2000, Paper No. NACE-00123 (18 p.).

Gilbert, Paul D. et al., "TetrakisHydroxymethylPhosphonium Sulfate (THPS) for Dissolving Iron Sulfides Downhole and Topsides—A Study of the Chemistry Influencing Dissolution," Corrosion 2012, Denver, CO, Apr. 2002, Paper No. NACE-02030 (14 p.).

PCT/US2022/026149 International Search Report and Written Opinion dated Jul. 25, 2022 (17 p.).

* cited by examiner

COMPOSITIONS AND METHODS FOR THE DISSOLUTION OF IRON SULFIDE

CROSS-REFERENCE TO RELATED APPLICATIONS

This application is a 35 U.S.C. § 371 national stage application of PCT/US2022/026149 filed Apr. 25, 2022, entitled "COMPOSITIONS AND METHODS FOR THE DISSOLUTION OF IRON SULFIDE," which claims priority to U.S. Provisional Application Ser. No. 63/179,164 filed Apr. 23, 2021 and entitled "COMPOSITIONS AND METHODS FOR THE DISSOLUTION OF IRON SULFIDE," each of which is hereby incorporated herein by reference in its entirety for all purposes.

TECHNICAL FIELD

The present disclosure relates generally to compositions and methods for reducing contaminants arising in the performance of industrial processes. More specifically, the present disclosure relates to a compositions and methods for the dissolution of iron sulfide.

SUMMARY

Disclosed herein are embodiments of methods for reducing scale on a surface. In one embodiment, a method of reducing scale on a surface comprises contacting (i) one or more biochelants; (ii) one or more organophosphorus compound; (iii) an optional enhancer; and (iv) a solvent with the surface having one or more deposits comprising iron sulfide.

Also disclosed herein are embodiments of compositions for reducing scale. In one embodiment, a composition comprises (i) a biochelant; (ii) an organophosphorus compound; (iii) an optional enhancer; and (iv) a solvent.

Also disclosed herein are embodiments of methods for servicing a wellbore in a subterranean formation. In one embodiment, a method of servicing a wellbore disposed in a subterranean formation comprising placing into the wellbore a fluid comprising a biochelant; (ii) an organophosphorus compound; (iii) an optional enhancer and (iv) a solvent for a time period sufficient to reduce a level of iron sulfide deposits by at least about 10% wherein the optional enhancer comprises an amino alcohol.

BACKGROUND

During the production stage of a wellbore, fluids (e.g., gas, oily steam, hot water, etc.) are generally produced from the wellbore. As a result of the fluid-production, scale can develop in the wellbore, subterranean formation and/or on equipment associated with the wellbore, such as downhole equipment (e.g., casings, production tubing, mandrels, pipes, pumps, etc.) and surface equipment (e.g., pumps, heating turbines, heat exchangers, etc.).

Hydrogen sulfide, $H_2S$, is a naturally occurring contaminant of fluids that is encountered in industries such as the oil and gas industry. The corrosive nature of $H_2S$ may cause accumulation of particulate iron sulfide in the form of scale deposits on the surfaces of conduits such as pipelines. The physical characteristic of the iron sulfide scale deposits can vary from a viscous, oil coated mass to a dry black powder form. Because various chemical and physical conditions can contribute to the formation of iron sulfide scales, several forms can be found in a given section of a wellbore and a pipeline. It is seldom that a single type of iron sulfide scale exists; but more generally it is a mixture of iron sulfide scales, including pyrrhotite ($F_7S_8$), troilite (FeS), marcasite ($FeS_2$), pyrite ($FeS_2$), greigite ($Fe_2S_4$) and mackinawite ($F_9S_8$).

BRIEF DESCRIPTION OF DRAWINGS

For a detailed description of the aspects of the disclosed processes and systems, reference will now be made to the accompanying drawings in which.

DETAILED DESCRIPTION

Figure 1:
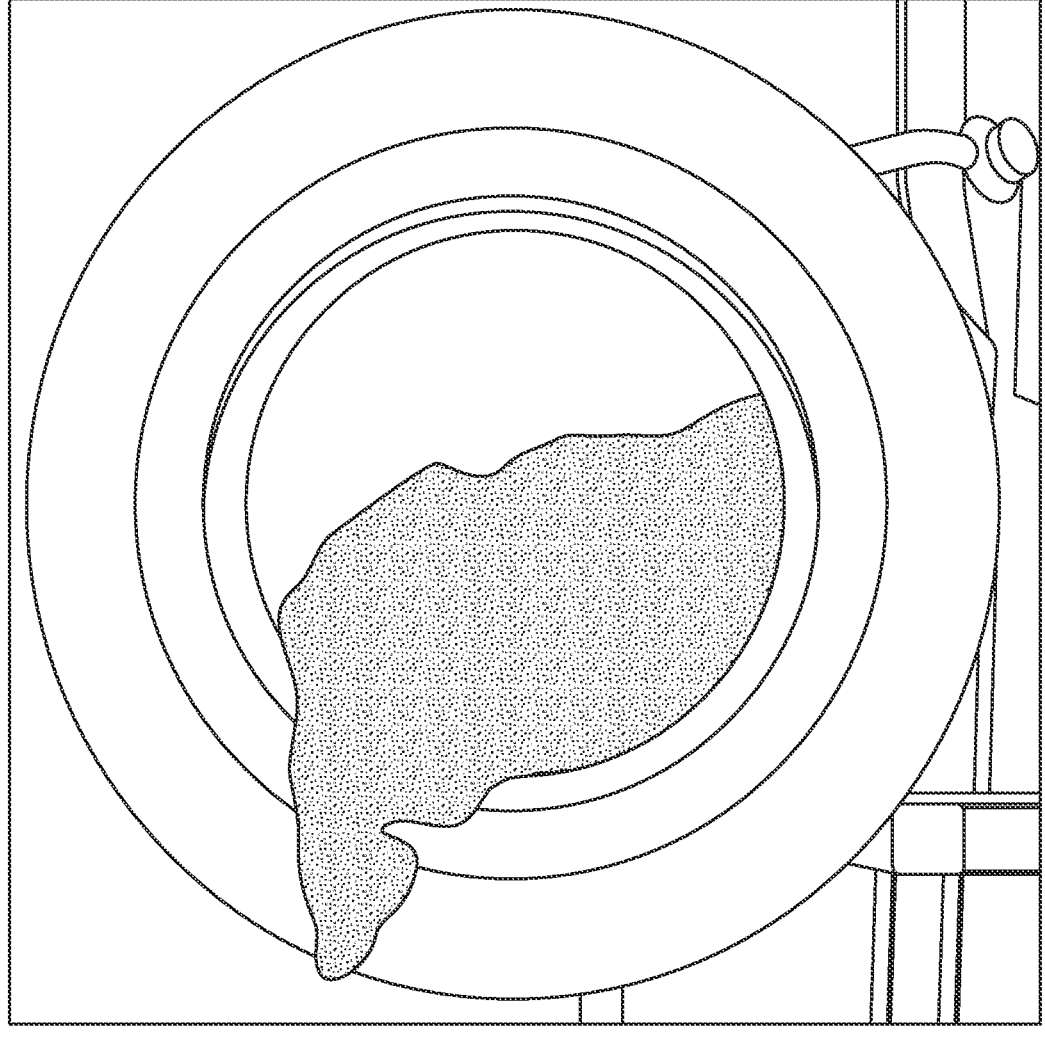
FIG. 1 is a depiction of a surface tubular with accumulated iron sulfide deposits.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Groups of elements of the periodic table are indicated using the numbering scheme indicated in the version of the periodic table of elements published in Chemical and Engineering News, 63 (5), 27, 1985. In some instances, a group of elements can be indicated using a common name assigned to the group; for example, alkali metals for Group 1 elements, alkaline earth metals for Group 2 elements, transition metals for Group 3-12 elements, and halogens for Group 17 elements, among others.

Regarding claim transitional terms or phrases, the transitional term "comprising", which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, when describing a compound or composition "consisting essentially of" is not to be construed as "comprising," but is intended to describe the recited component that includes materials which do not significantly alter the composition or method to which the term is applied. While compositions and methods are described in terms of "comprising" various components or steps, the compositions and methods can also "consist essentially of" or "consist of" the various components or steps.

In the specification and claims, the terms "a," "an," and "the" are intended, unless specifically indicated otherwise, to include the possibility of plural alternatives, e.g., at least one, or one or more. For any particular compound disclosed herein, the general structure or name presented is also intended to encompass all structural isomers, conformational isomers, and stereoisomers that can arise from a particular set of substituents, unless indicated otherwise. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

As previously described, iron sulfide scale can form on surfaces of conduits such as pipelines. Scale deposits of iron sulfide form layers that continue to grow unless treated. Scale deposits in the near-wellbore region can damage the formation and cause a decrease in well productivity. Scale deposits can also cause equipment to malfunction and block flow anywhere along the production conduit or in processing facilities.

The deposits can also obstruct the flow of oil in wells, in the adjacent strata and in pipelines as well as in processing and refinery plants. Further, such deposits tend to stabilize oil-water emulsions that tend to form during secondary oil recovery. Such deposits present a significant problem because the deposits hinder accurate determinations of pipeline structural integrity and the pipelines must be cleaned physically.

Because the formation of iron sulfide scale is difficult to inhibit, it is sometimes allowed to accumulate uninhibited until enough iron sulfide scale has deposited to warrant remediation by either mechanical cleaning or acid treatment. For example, the use of a strong acid, such as 10 weight percent (wt. %) to 20 wt. % HCl, is the simplest way to dissolve iron sulfide scales, however, it is ineffective in dissolving the pyrite and marcasite. Additionally, using a strong acid generates large volumes of highly toxic $H_2S$ gas, which is an undesirable by-product. The strong acid can also have corrosive effects on the wellbore equipment and may damage the formation.

Accordingly, there exists an ongoing need for compositions and methods of iron sulfide dissolution that would be effective and efficient for all forms of iron sulfide deposits, non-corrosive to the equipment, low cost, and which would not cause damage to the formation and the environment.

Disclosed herein are methods and compositions for dissolution of iron sulfide. In one or more aspects, the compositions comprise: (i) a biochelant (ii) an organophosphorus compound (iii) an optional enhancer and (iv) a solvent. In one or more aspects, the optional enhancer comprises an enhancing chelant, an amine, an amino alcohol, or a combination thereof. Hereinafter, the compositions are termed iron sulfide dissolvers and designated ISD. Methods of the present disclosure may comprise contacting an ISD with one or more surfaces having or suspected of having iron sulfide deposits.

In an aspect, the ISD comprises a chelant. Herein, a chelant, also termed a sequestrant, a chelating agent or sequestering agent, refers to a molecule capable of bonding or forming a complex with a metal. The chelant may be characterized as a ligand that contains two or more electron-donating groups so that more than one bond is formed between an atom on each of the electron donating groups of the ligand to the metal. This bond can also be dative or a coordinating covalent bond meaning each electronegative atom provides both electrons to form bonds to the metal center. In an aspect, the chelant is a biochelant. As used herein, the prefix "bio" indicates that the chemical is produced by a biological process such as using an enzyme catalyst.

In an aspect, the biochelant comprises aldonic acid, uronic acid, aldaric acid, or a combination thereof and a counter cation. For example, the biochelant may be a mixture of aldaric, uronic acids, and their respective counter-cations.

In an aspect, the biochelant comprises a glucose oxidation product, a gluconic acid oxidation product, a gluconate, or a combination thereof. The glucose oxidation product, gluconic acid oxidation product, or combination thereof may be buffered to a suitable pH.

Additionally or alternatively, in one or more aspects, the biochelant comprises glucaric acid, gluconic acid, glucuronic acid, glucose oxidation products, gluconic acid oxidation products or a combination thereof. Additionally or alternatively, in one or more aspects, the biochelant comprises disaccharides, oxidized disaccharides, uronic acid, aldaric acid or a combination thereof.

Additionally or alternatively, in one or more aspects, the biochelant comprises gluconic acid, glucaric acid, glucuronic acid, n-keto-acids, $C_2$ to $C_6$ diacids or a combination thereof.

Additionally or alternatively, inone or more aspects, the biochelant comprises galactonic acid, galactaric acid, an oxidation product comprising predominantly (e.g., greater than about 50 weight percent) galactonic acid and/or galactaric acid with minor component species of n-keto-acids, $C_2$ to $C_6$ diacids or a combination thereof. Additionally or alternatively, in one or more aspects, the biochelant comprises glutamic acid. Additionally or alternatively, in one or more aspects, the biochelant comprises glucodialdose, 2-ketoglucose or a combination thereof.

In such aspects, the buffered glucose oxidation product, the buffered gluconic acid oxidation product, or combinations thereof are buffered to a suitable pH. For example, the glucose oxidation product, gluconic acid oxidation product or combination thereof may be buffered to a pH in the range of from about 1 to about 5. Buffering of the chelant may be carried using any suitable acid, base or combination thereof.

In one or more aspects, any biochelant or combination of biochelants disclosed herein may further comprise a counter-cation such as a Group 1 alkali metal, a Group 2 alkaline earth metal, or a combination thereof. For example, the counter-cation may comprise silicates, borates, aluminum, calcium, magnesium, ammonium, sodium, potassium, cesium, strontium, or a combination thereof.

In an aspect, the biochelant comprises a glucose oxidation product, a gluconic acid oxidation product, a gluconate, glucaric acid, an oxidized glucuronolactone, a uronic acid oxidation product or a combination thereof. Alternatively, the biochelant comprises a buffered glucose oxidation product, a buffered gluconic acid oxidation product or combinations thereof. In some such aspects, the buffered glucose oxidation product, the buffered gluconic acid oxidation product, or combinations thereof are buffered to a pH within a range disclosed herein with any suitable acid or base such as sodium hydroxide. In an example of such aspects, the biochelant comprises a mixture of gluconic acid and glucaric acid and further comprises a minor component species comprising n-keto-acids, $C_2$-$C_6$ diacids or combinations thereof. In an aspect, the biochelant comprises a metal chelation product commercially available from Solugen, Inc. of Houston Texas as Biochelate™.

In various aspects, the chelant may be present in the IDS in an amount of from about 5 weight percent (wt. %) to about 70 wt. %, alternatively, from about 5 wt. % to about 70 wt. %, alternatively, from about 5 wt. % to about 30 wt. %, or alternatively, from about 20 wt. % to about 40 wt. % based on the total weight of the IDS. Herein, all weight percentages are based on the total weight of the composition being described unless indicated otherwise.

In an aspect, the optional enhancer comprises an enhancing chelant. Examples of enhancing chelants suitable for use in the present disclosure may include, without limitation, citric acid, ethylene diamine tetraacetic acid (EDTA), nitrilotriacetic acid (NTA), hydroxyethylidene diphosphonic acid, methylglycine N,N-diacetic acid trisodium salt (MGDA), N,N-dicarboxymethyl glutamic acid tetrasodium salt (GLDA), 1,10-phenanthroline, acetylacetone, aminomethylphosphonic acid, diethylenetriaminepentaacetic acid (DTPA), hydroxyethyliminodiacetate (HEIDA), 1,2-cyclohexylenedinitrilo tetraacetic acid (CDTA), succinic acid, tartaric acid, benzotriazole, benzoylacetone, bipyridine, 2,2'-bipyrimidine, 1,2-bis(dicyclohexylphosphino)ethane, 1,2-bis(dimethylphosphino)ethane, 1,2-bis(diphenylphosphino) benzene, 1,4-bis(diphenylphosphino)butane, 1,2-bis(diphenylphosphino)ethylene, bis(diphenylphosphinoethyl) phenylphosphine, 1,2-bis(diphenylphosphino)ethane, trans-1,2-diaminocyclohexane, 1,2-diaminopropane, tetramethylethylenediamine, 1,1,1-tris(diphenylphosphinomethyl)ethane, ethylenediamine-N,N'-disuccinic acid (EDDS) or a combination thereof. In an aspect, the enhancingchelant is present in the IDS in an amount of from about 1 wt. % to about 40 wt. %, alternatively from about 1 wt. % to about 10 wt. %, alternatively from about 5 wt. % to about 40 wt. %, or alternatively from about 5 wt. % to about 20 wt. %.

In an aspect, the IDS comprises an organophosphorus compound or a phosphonium salt thereof. In an aspect, the organophosphorus compound has the general formula (OR)$_4$P$^+$[anion] where R is an alkyl group and the anion provides a monovalent negative charge. The term "alkyl group" is used herein in accordance with the definition specified by IUPAC: a univalent group formed by removing a hydrogen atom from an alkane. In one or more aspects, R is a $C_1$ to $C_{20}$, a $C_1$ to $C_{10}$, or a $C_1$ to $C_5$ alkyl group. In various aspects disclosed herein, R is selected from the group consisting of a methyl group, an ethyl group, a propyl group, a butyl group, a pentyl group, a hexyl group, a heptyl group, and an octyl group. Nonlimiting examples of organophosphorus compounds suitable for use in the present disclosure include tetrakis(hydroxymethyl)phosphonium sulfate (THPS), tetrakis(hydroxymethyl)phosphonium chloride (THPC), phosphonium salts, or a combination thereof.

The organophosphorus compound may be present in the IDS in an amount of from about 5 wt. % to about 80 wt. %, alternatively from about 5 wt. % to about 60 wt. %, alternatively from about 30 wt. % to about 80 wt. % or alternatively from about 10 wt. % to about 30 wt. %.

Additionally or alternatively, in an aspect, the optional enhancer comprises an amine, or alternatively an amino alcohol characterized by the general formula R$_2$N-OH where R can be hydrogen or an alkyl group. In one or more aspects, R is a $C_1$ to $C_{20}$, a $C_1$ to $C_{10}$, or a $C_1$ to $C_5$ alkyl group. In any aspect or embodiment disclosed herein, R is selected from the group consisting of a methyl group, an ethyl group, a propyl group, a butyl group, a pentyl group, a hexyl group, a heptyl group, and an octyl group. In an aspect, the amine comprises monoethanolamine. aminoethylethanolamine, or a combination thereof.

The amine or amino alcohol may be present in the IDS in an amount of from about 0.1 wt. % to about 30 wt. %, alternatively from about 0.1 wt. % to about 10 wt. %, alternatively from about 5 wt. % to about 30 wt. % or alternatively from about 0.1 wt. % to about 5 wt. %.

In an aspect, the IDS further comprises a solvent such as an aqueous fluid. Aqueous fluids that may be suitable for use as solvents in the methods and compositions of the present disclosure may include water from any source. Such aqueous fluids may include fresh water, salt water (e.g., water containing one or more salts dissolved therein), brine (e.g., saturated salt water), seawater, and combinations thereof. The aqueous fluids may be from a source that does not contain compounds that adversely affect other components of the IDS. In certain aspects of the present disclosure, the aqueous fluids may include one or more ionic species, such as those formed by salts dissolved in water. For example, seawater and/or produced water may include a variety of divalent cationic species dissolved therein.

In certain aspects, an aqueous fluid suitable for use as a solvent may include water with one or more water-soluble salts dissolved therein. In certain aspects, the one or more salts may include inorganic salts, formate salts, or combinations thereof. Inorganic salts may include monovalent salts, which may further include alkali metal halides (e.g., sodium chloride), ammonium halides, and combinations thereof. Brines including such monovalent salts may be referred to as "monovalent brines." Inorganic salts may also include divalent salts, such as alkaline earth metal halides (e.g., CaCl$_2$, CaBr$_2$, etc.) and zinc halides. Brines including such divalent salts may be referred to as "divalent brines."

In an aspect, the solvent (e.g., aqueous fluid) comprises the remainder of the IDS when all other components are accounted for. The solvent may also include a winterization or freeze-point depressant which may include glycols and alcohols in conjunction with aqueous fluid to reduce the pour point of the final product.

In an aspect, an IDS suitable for use in the present disclosure comprises an organophosphorus compound and a chelant. For example, the IDS may comprise (i) an organophosphorus compound selected from the group consisting of THPS, THPC, and a combination of THPS and THPC in a ratio of from about 20:1 to about 1:20 and (ii) a biochelant. In another aspect, the IDS comprises (i) an organophosphorus compound selected from the group consisting of THPS, THPC, and a combination of THPS and THPC in a ratio of from about 20:1 to about 1:20; (ii) a biochelant and (iii) an enhancing chelant. In another aspect, the IDS comprises (i) an organophosphorus compound selected from the group consisting of THPS, THPC, and a combination of THPS and THPC in a ratio of from about 20:1 to about 1:20; (ii) a biochelant, (iii) a solvent and (iv) an amine. In another aspect, the IDS comprises (i) an organophosphorus compound selected from the group consisting of THPS, THPC, and a combination of of THPS and THPC in a ratio of from about 20:1 to about 1:20; (ii) a biochelant (iii) an amine, (iv) a solvent and (v) an enhancing chelant. In another aspect, the IDS comprises (i) an organophosphorus compound selected from the group consisting of THPS, THPC, and a combination of THPS and THPC in a ratio of from about 20:1 to about 1:20; (ii) a biochelant, (iii) an amino alcohol, (iv) a solvent and (v) an enhancing chelant.

In an aspect, and not intending to be bound by theory, an IDS as disclosed herein may be effective to sequester ferric ions. For example, the IDS may be contacted with an insoluble iron complex (e.g., iron sulfide) and sequester or chelate the ferrous ion, ferric ion or both. The sequestered ferrous ion, ferric ion or both may be thus rendered soluble in the surrounding fluid.

Additionally, in an aspect, the compositions disclosed herein, for example, the IDS, can provide a carbon negative method of iron sulfide dissolution when compared to traditional methods of iron sulfide dissolution which tend to generate $CO_2$. Specifically, in the presence of produced water the IDS can sequester carbon dioxide dissolved in the water.

Advantageously, the IDS formulations disclosed herein demonstrate an increased amount of iron sulfide dissolution when compared to the use of an organophosphorus compound alone (e.g., THPS).

The IDS of the present disclosure may be effective to dissolve iron sulfide. Further disclosed herein is a reproducible method to validate the dissolution of iron sulfide. The presently disclosed subject matter is especially interesting as gluconic acid and gluconates acids have been shown to be ineffective at iron sulfide dissolution due to the fact that most iron scale or iron deposits contain iron in the ferrous form. Furthermore, the present disclosure shows that typical iron sulfide dissolution chemistries such as THPS and THPC do not work as well as the aforementioned IDS composition, which is an unexpected result.

In an aspect, a method of the present disclosure comprises introducing, into a wellbore, a wellbore servicing fluid comprising an IDS of the type disclosed herein. For example, the IDS may be placed into a wellbore and allowed to remain in the wellbore for some period of time before being displaced by another wellbore servicing fluid. While present in the wellbore, the wellbore servicing fluid comprising an IDS may be placed in contact with insoluble materials comprising ferrous or ferric ion (e.g., iron sulfide or formation minerals) so as to dissolve the insoluble materials. The IDS may be allowed to remain in contact with the insoluble materials for a sufficient duration as to wholly or substantially dissolve the insoluble materials.

In an aspect, the IDS displays an efficiency at sequestering ferric and/or ferrous ion that is increased by at least 10%, alternatively at least 20% or alternatively at least 30% when compared to the amount of iron sequestered by the enhancing chelant in the absence of the biochelant. Without wishing to be limited by theory, the presence of a biochelant of the type disclosed herein allows for a reduction in the use of organophosphorus compounds (e.g., THPS) which mitigates the negative aspects of utilizing organophosphorus compounds (e.g., biocidal).

Again not intending to be bound by theory, the sequestration of the iron (ferric or ferrous) results in the formation of a soluble iron compound and a sulfide ion that can also be solubilized thus reducing the amount of scale. As such, the IDS may facilitate the dissolution of iron sulfide compounds which can precipitate on surfaces such as a wellbore formation matrix, perforations, tubulars, and other equipment associated with wellbore servicing. As they accumulate, they can lead to decreased well production or well injectivity, as well as localized corrosion issues by acting as a galvanic cell.

EXAMPLES

The subject matter having been generally described, the following examples are given as particular aspects of the disclosure and are included to demonstrate the practice and advantages thereof, as well as aspects and features of the presently disclosed subject matter. It should be appreciated by those of skill in the art that the techniques disclosed in the examples which follow represent techniques discovered by the inventors to function well in the practice of the present subject matter, and thus can be considered to constitute preferred modes for its practice. However, those of skill in the art should, in light of the present disclosure, appreciate that many changes can be made in the specific aspects which are disclosed and still obtain a like or similar result without departing from the scope of the instant disclosure. It is understood that the examples are given by way of illustration and are not intended to limit the specification of the claims to follow in any manner.

The following abbreviations are used herein: tetrakis (hydroxymethyl)phosphonium sulfate chloride (THPS); tetrakis(hydroxymethyl)phosphonium (THP); tetrakis(hydroxymethyl)phosphonium sulfate+gluconic acid (THPS+); tetrakis(hydroxymethyl)phosphonium sulfate+gluconic acid+diammonium salt of ethylenediaminetetraacetic acid (THPC++E); gluconic acid+sodium gluconate (SCAV-SOL™); gluconic acid (GO50; gluconic acid+glucaric acid+ sodium gluconate+sodium glucarate (GOGA 55); gluconic acid+sodium gluconate+1-hydroxyethane 1,1-diphosphonic acid (SCALESOL HEDP 60, gluconic acid+citric acid (2525C Acid), monoethanolamine (MEA); aminoethylethanolamine (AEEA); gluconic acid+glucaric acid+sodium gluconate+sodium glucarate (GOGA 55); and gluconic acid+ sodium gluconate+1-hydroxyethane 1,1-diphosphonic acid (SCALESOL HEDP 60).

Example 1

Figure 2:
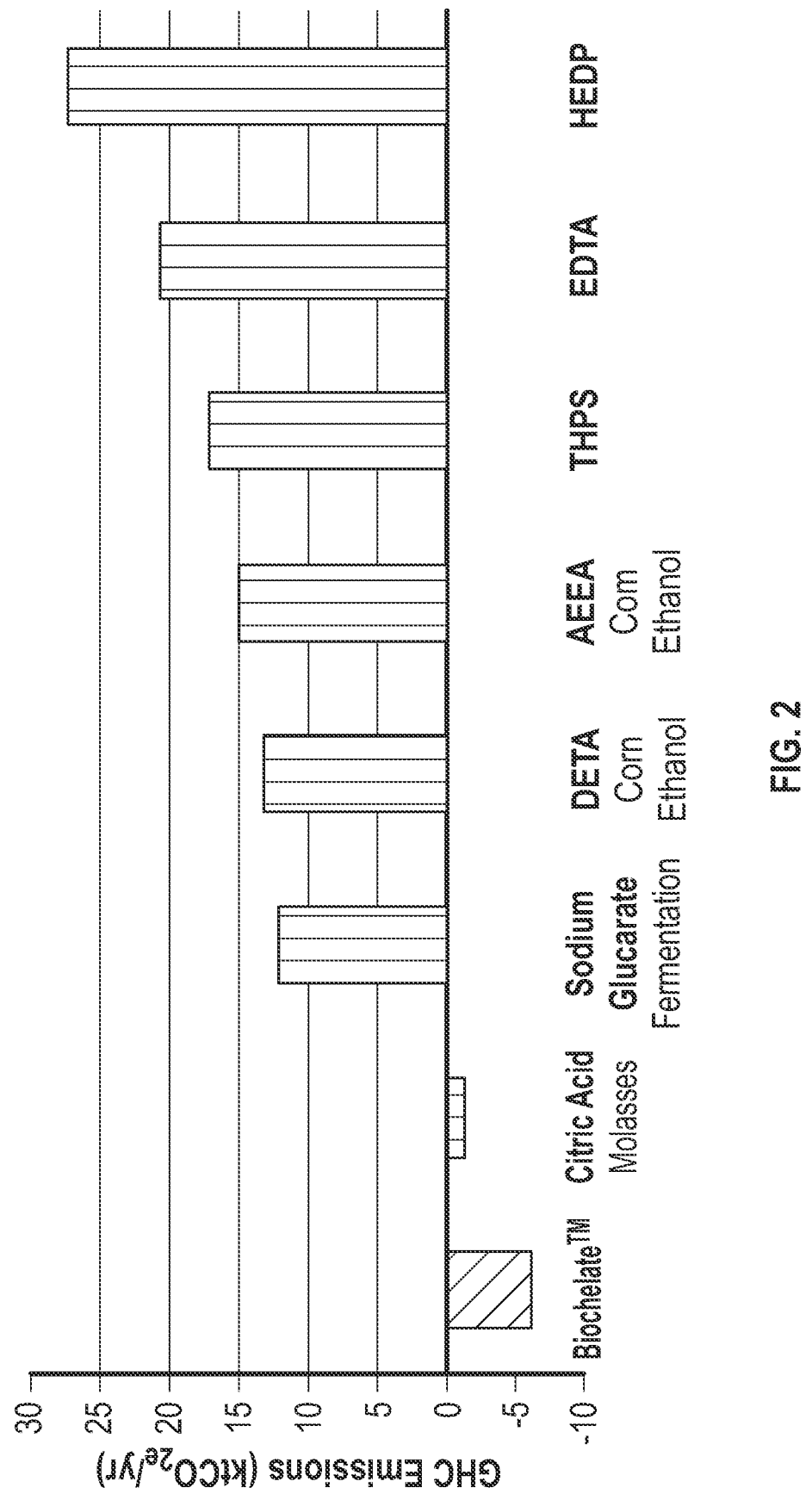
FIG. 2 is graph of green house gas emissions for samples from Example 1 when contacted with produced water.

FIG. 1 is a depiction of scale accumulated at surface flowlines near a wellhead. An enhancing chelant (e.g., EDTA) when introduced to produced water such as in a Saltwater Disposal Well (SWD) typically contribute to $CO_2$ emissions. Specifically, the addition of an enhancing chelant to the water present in the SWD, resulted in an increased evolution of $CO_2$. In sharp contrast, introduction of an IDS of the type disclosed herein to the SWD resulted in a reduced amount of $CO_2$ evolution which demonstrates the IDS actively sequester $CO_2$, FIG. 2.

Example 2

Figure 3:
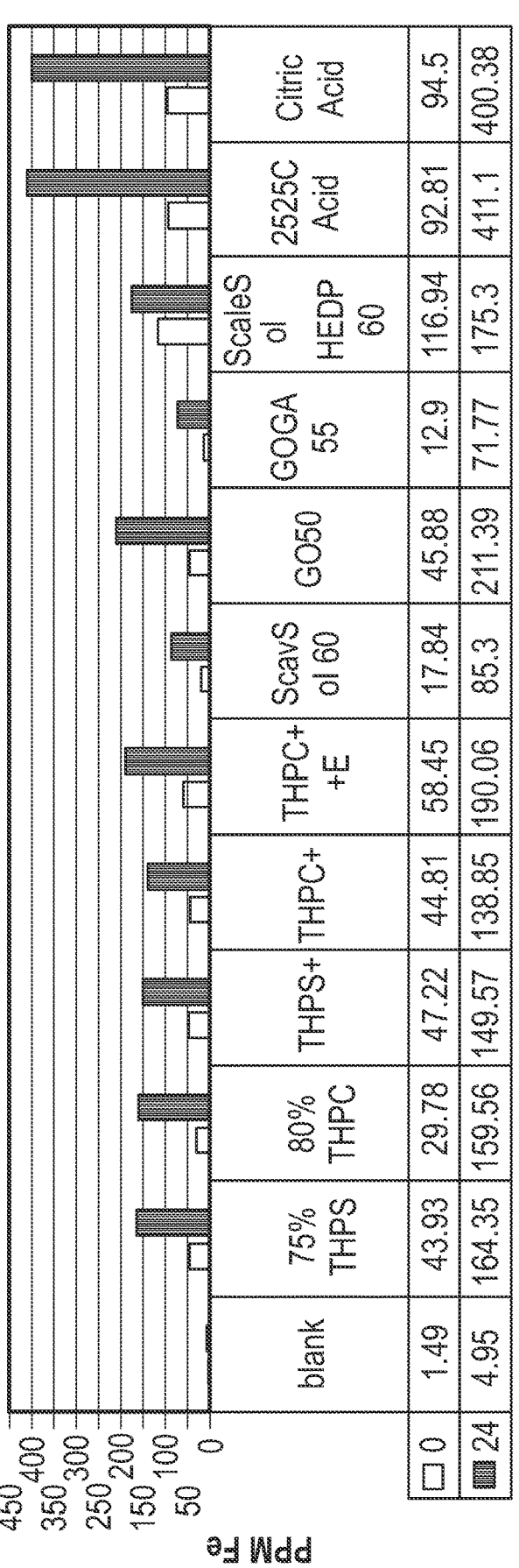
FIG. 3 is a plot of the amount of iron sequestered as a function of sample at initiation and after 24 hours.

The ability of various compositions to chelate ferrous sulfide was investigated. Referring to FIG. 3, it was demonstrated that gluconic acid (GO50) and gluconic acid plus citric acid (2525C Acid) exhibited a higher chelation affinity than the THPS and THPC. FIG. 3 shows the difference in chelation at the start and end of a 24-hour period, additive gluconic acid and sodium gluconate, commercially available from Solugen Inc as SCAVSOL™, boosted the performance of both THPS and THPC while the combination of SCAV-SOL™ and THPS appeared to have the fastest rate of iron sulfide dissolution. However, the combination of SCAV-SOL™, THPS and EDTA resulted in the highest amount of iron sulfide dissolution. Notably, an IDS containing a chelant of the type described herein was able to effective to dissolve ferrous sulfide. This was an unexpected advantage of the present compositions as other carboxylic acids were ineffective dissolvers of ferrous sulfide.

Figure 4:
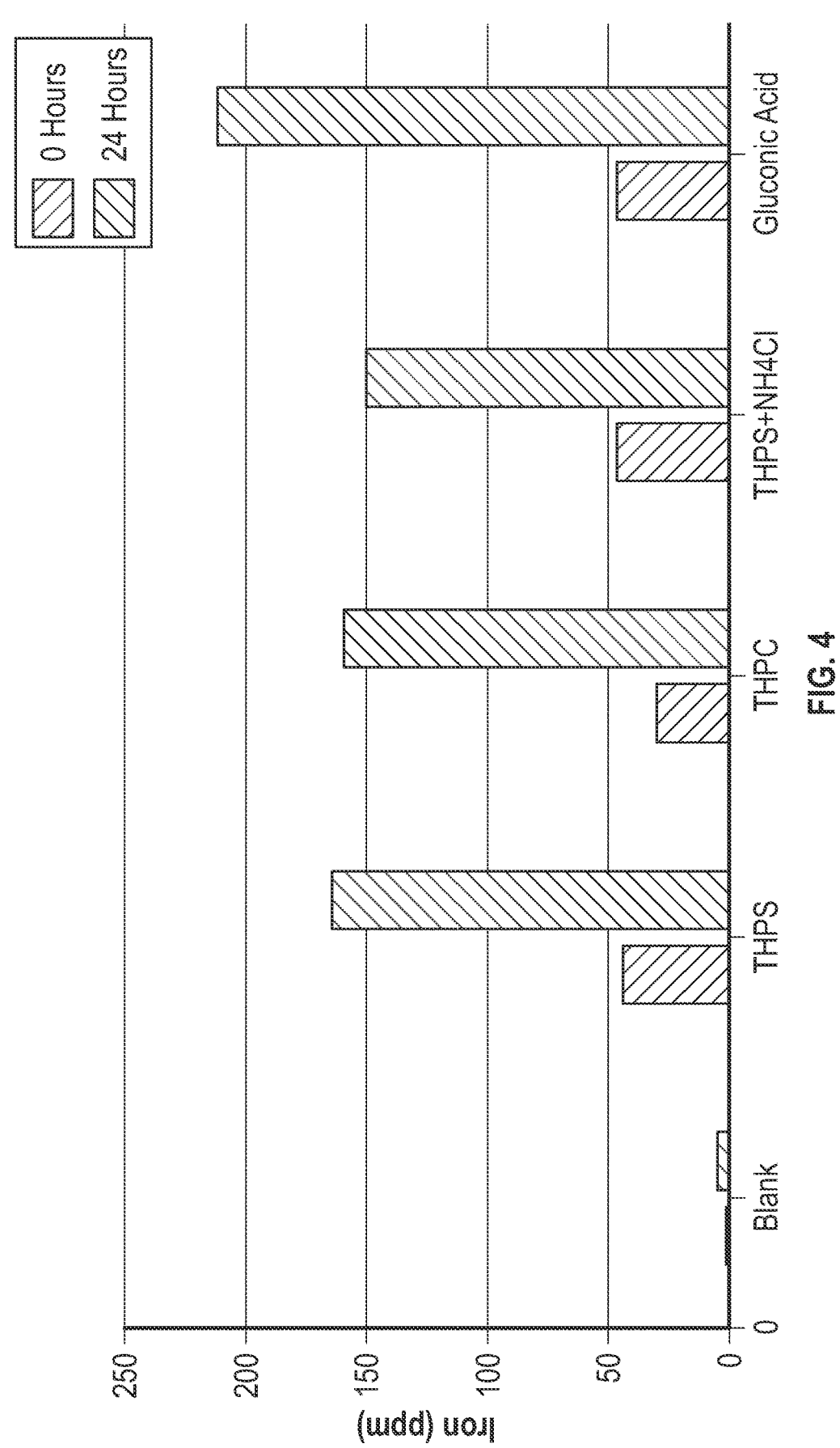
FIG. 4 is a plot of the iron sequestered as a function of sample components for the samples from Example 2.

Further, the present data indicate that iron sulfide dissolution chemistries such as THPS, THPC demonstrated lesser effectiveness when compared to biochelants of the present disclosure. Specifically, gluconic acid alone was found to sequester iron at a higher concentration in comparison to the amount sequestered by THPS and THPC, as shown in FIG. 4.

Example 3

Figure 5:
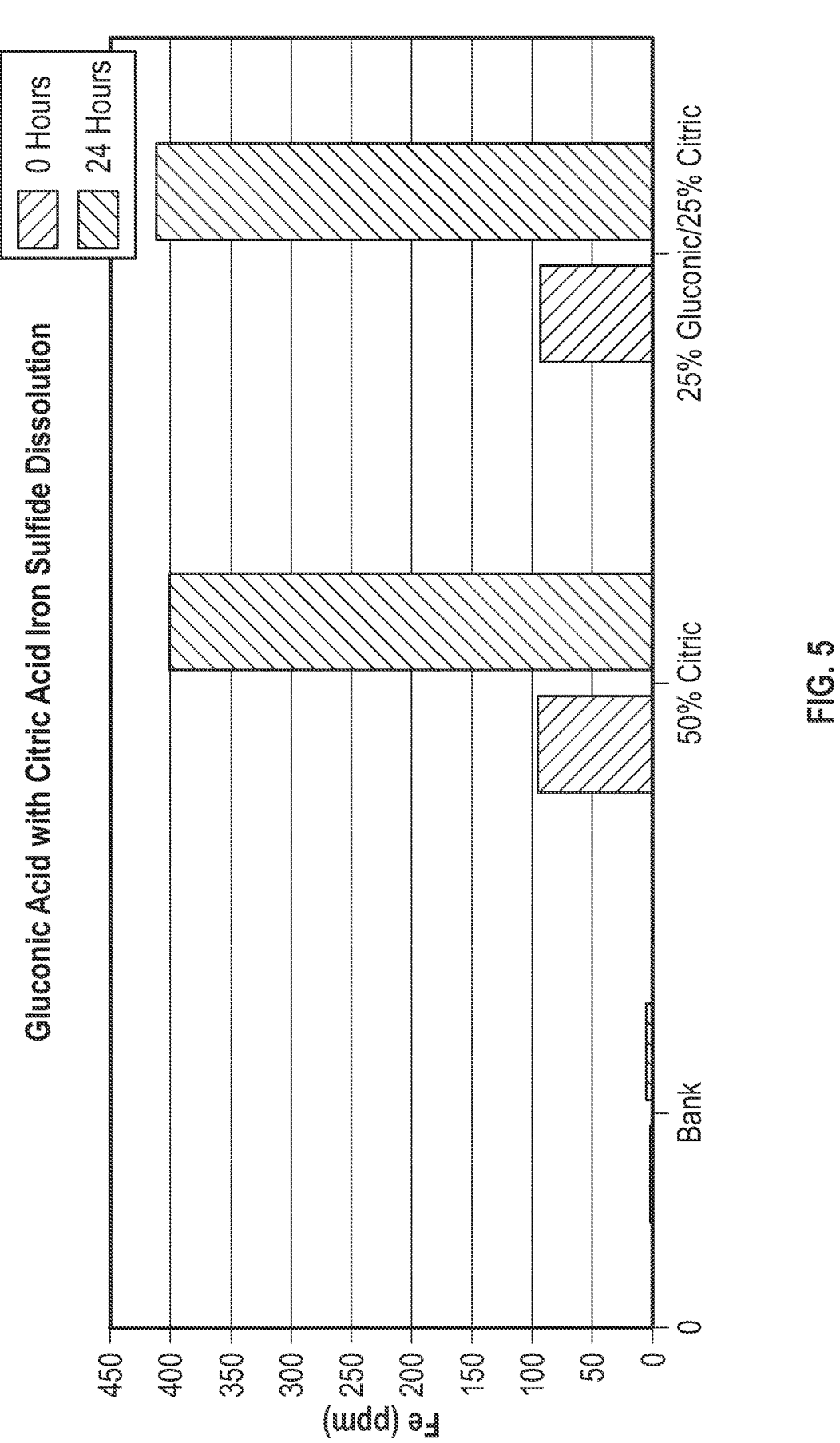
FIGS. 5 and 6 are plots iron sequestered as a function of the amount of citric acid in the samples from Example 3.
Figure 6:
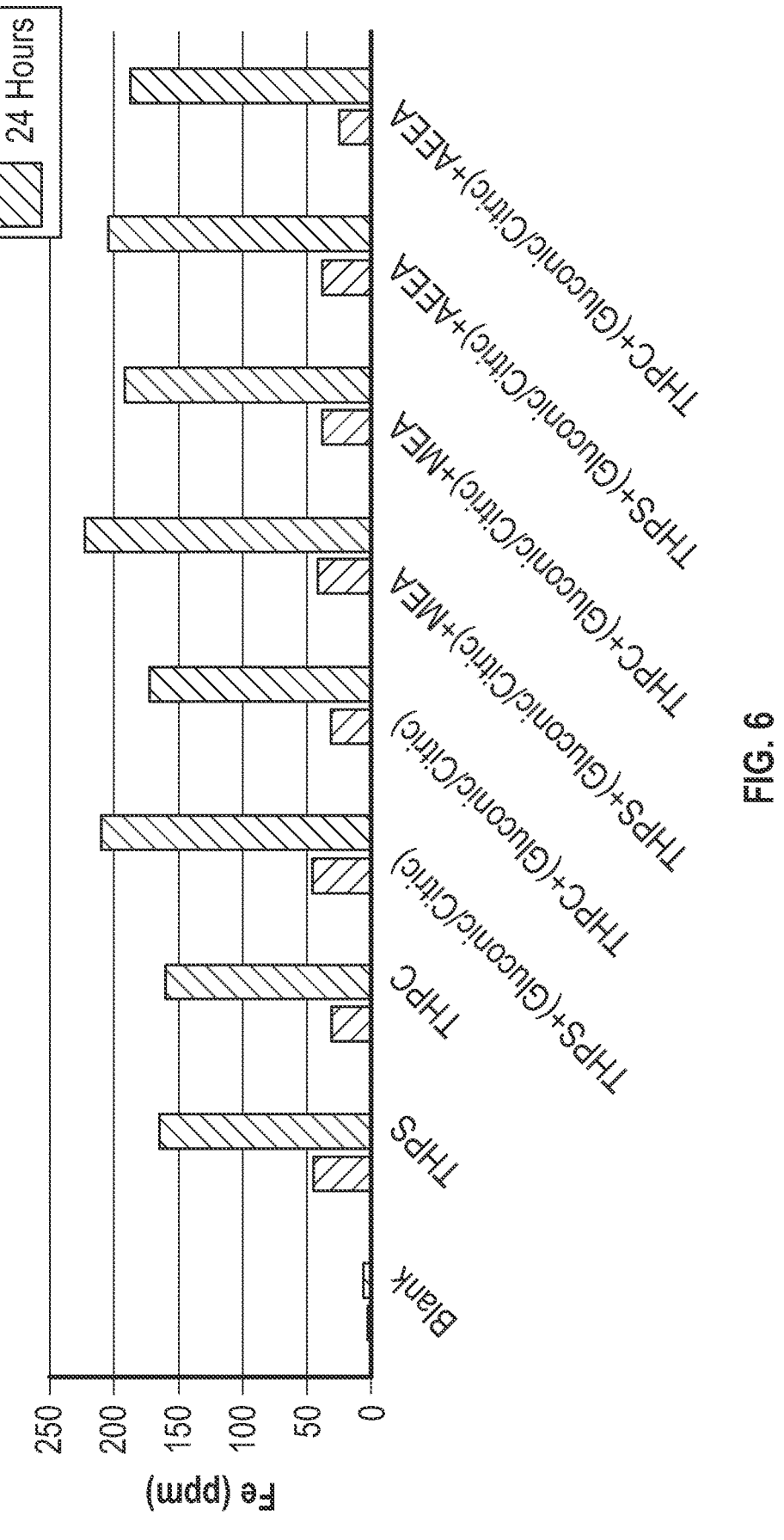

The ability of an IDS of the type disclosed herein to sequester iron sulfide was investigated. Specifically, an IDS composition was prepared containing a combination of gluconic acid and an enhancing chelant, citric acid. The IDS was placed in contact with an iron sulfide composition for 24 hours. The results are presented in FIG. 5 where the y-axis indicates the ppm of iron. Referring to FIG. 5, it was observed that while gluconic acid alone does not effectively sequester ferrous iron, with the addition of citric acid, gluconic acid's ability to sequester ferrous ion increased. The addition of citric acid to a number of IDS compositions comprising a biochelant of the type disclosed herein resulted in an increased ability of the composition to sequester iron as shown in FIG. 6.

Example 4

The iron sequestering ability of an IDS of the type disclosed herein was further investigated. Specifically, a mixture of ferrous iron and sodium sulfide was used to generate iron sulfide in situ and subsequently contacted with an IDS to determine if the composition can effectively sequester iron resulting in the dissolution of iron sulfide. The sodium sulfide and iron chloride were added to water in a stoichiometric ratio $$FeCl_2 + Na_2S \rightarrow FeS + 2NaCl$$

Figure 7:
FIG. 7 is a plot of the amount of iron sequestered as a function of sample composition.

Then, additives were added at 100 ppm (wet, as product). Aliquots were taken at 10 min and 2.5 hrs respectively. The amount and type of compound used in each sample and the amount of iron sequestered after 10 min and after 2.5 hours are presented in Table 1. The results are shown in FIG. 7 which shows a synergistic effect of LG60 (a mixture of gluconic acid and sodium gluconate) and THPS. This was further substantiated as there is less active chelating agent with this blend.

TABLE 1

| Product Used | ppm wet | ppm active | Fe ppm @ 10 min | Fe ppm @ 2.5 hrs |
|---|---|---|---|---|
| Control | 0 | 0 | 55.20 | 51.96 |
| 75% THPS | 100 | 75 | 82.56 | 56.59 |
| LG60 | 100 | 60 | 90.38 | 55.45 |
| 1:1 75% THPS + LG60 | 100 | 68 | 93.65 | 74.06 |
| 75% THPS + 1% NH4Cl | 100 | 75 | 89.17 | 56.57 |

Figure 8:
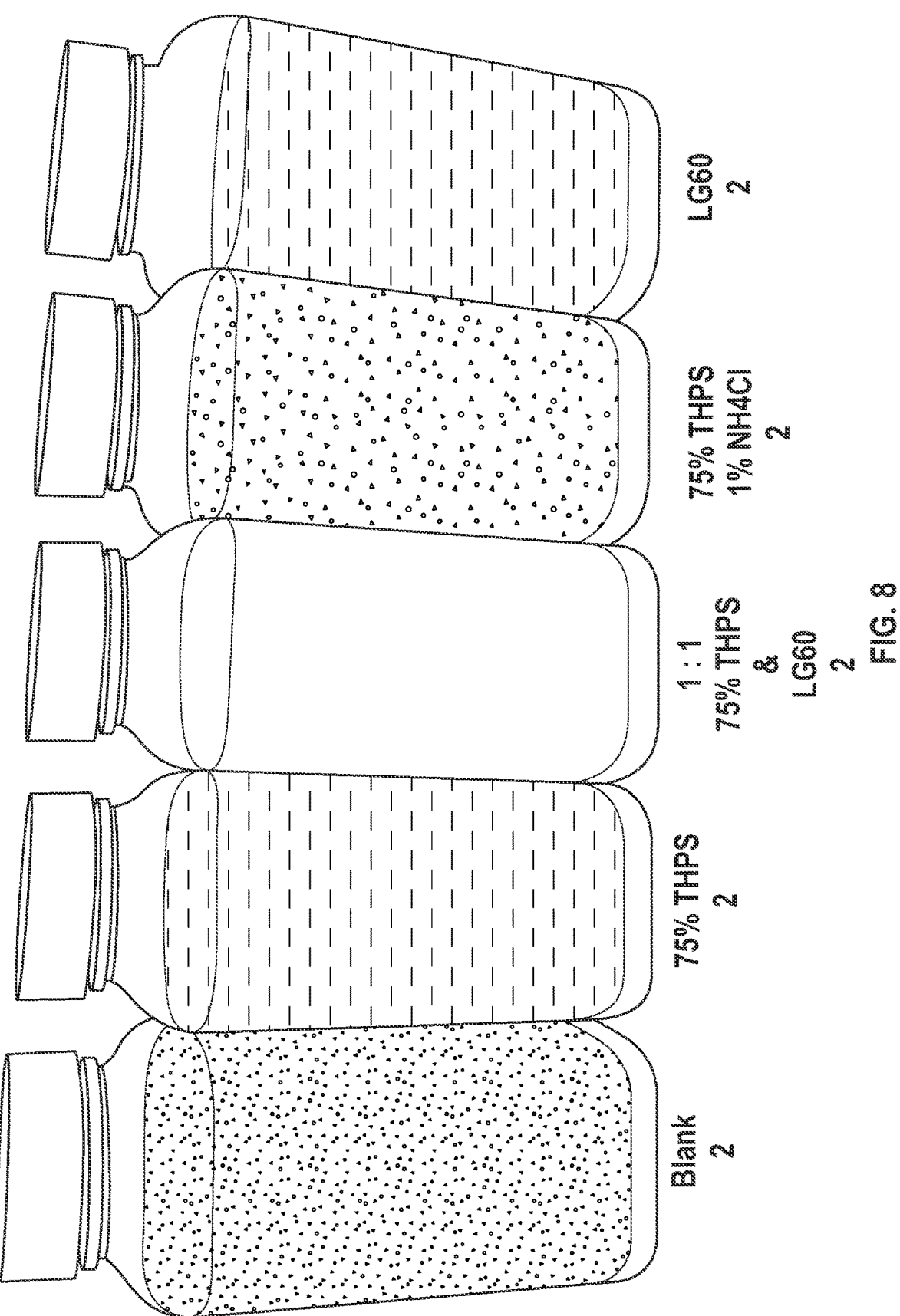
FIG. 8 is a depiction of the samples from Example 4 after a reaction time of 2.5 hours.

As shown in the Table 1, the THPS and LG60 mixture had less product than the THPS/ammonia chloride as well as THPS sample but outperformed the rest of the products. Furthermore, it had the highest iron concentration in the water phase at 2.5 hrs, resulting in higher performance even after 150 minutes have elapsed. Visual observation of the sequestration performance of the various samples is shown in FIG. 8 which is a depiction of the mixtures after 2.5 hours. As seen in FIG. 8, the bottle dosed with 1:1 75% THPS+ LG60 in the middle visually showed more clarity compared to the counterparts dosed with THPS alone or with ammonium chloride, indicating that LG60 boosted the dissolving power of iron sulfide that are already formed.

ADDITIONAL DISCLOSURE

The following are non-limiting, specific aspects in accordance with the present disclosure:

A first aspect which is a process and composition for chelating iron sulfide in the upstream oil and gas industry.

A second aspect which is the process and composition of the first aspect which is dependent on the concentration of iron sulfide in the area and that would affect the dosage of the biochelant.

A third aspect which is the which is the process and composition of the second aspect in which the metal is ferrous or ferric iron.

A fourth aspect which is the process and composition of any of the first through third aspects in which the chelant is gluconic acid.

A fifth aspect which is the process and composition of any of first through fourth aspects wherein the chelant is a mixture of aldaric, uronic acids.

A sixth aspect which is the process and composition of any of the first through fifth aspects wherein the chelant is a mixture of aldaric, uronic acid, and their respective counter-cation.

A seventh aspect which is the process and composition of any of the first through sixth aspects wherein the chelant is comprised of glucaric acid, gluconic acid, glucuronic acid, glucose oxidation products, and gluconic acid oxidation products.

An eighth aspect which is the process and composition of any of the first through seventh aspects wherein the chelant is comprised of sugar oxidation products comprising of disaccharides, oxidized disaccharides, uronic acid, and aldaric acid.

A ninth aspect which is the process and composition of any of the first through eighth aspects wherein the chelant is comprised of gluconic acid, glucaric acid, glucuronic acid, n-keto-acids and $C_2$-$C_6$ diacids.

A tenth aspect which is the process and composition of any of the first through ninth aspects wherein the counter-cation comprises of an alkali earth metal of group 1 and group 2.

An eleventh aspect which is the process and composition of any of the first through tenth aspects wherein the counter-cation comprises of ammonium.

A twelfth aspect which is a method of reducing scale on a surface, the method comprising contacting (i) one or more biochelants; (ii) one or more organophosphorus compound; (iii) an optional enhancer and (iv) a solvent with the surface having one or more deposits comprising iron sulfide.

A thirteenth aspect which is the method of the twelfth aspect wherein the one or more biochelants comprise aldonic acid, uronic acid, aldaric acid, a glucose oxidation product, a gluconic acid oxidation product, a gluconate, glucaric acid, gluconic acid, glucuronic acid, comprises galactonic acid, galactaric acid, an oxidation product comprising predominantly galactonic acid and/or galactaric acid with minor component species of n-keto-acids, $C_2$ to $C_6$ diacids or a combination thereof.

A fourteenth aspect which is the method of any of the twelfth through thirteenth aspects wherein the one or more biochelants further comprises a counteraction.

A fifteenth aspect which is the method of the fourteenth aspect wherein the counteraction comprises silicates, borates, aluminum, calcium, magnesium, ammonium, sodium, potassium, cesium, strontium or a combination thereof.

A sixteenth aspect which is the method of any of the twelfth through fifteenth aspects wherein the optional enhancer comprises an enhancing chelant.

A seventeenth aspect which is the method of the sixteenth aspect wherein the enhancing chelant comprises citric acid, ethylene diamine tetraacetic acid (EDTA), nitrilotriacetic acid (NTA), hydroxyethylidene diphosphonic acid (HEDTA), methylglycine N, N-diacetic acid trisodium salt (MGDA), N, N-dicarboxymethyl glutamic acid tetrasodium salt (GLDA), 1,10-phenanthroline, acetylacetone, aminomethylphosphonic acid, benzotriazole, benzoylacetone, bipyridine, 2,2'-bipyrimidine, 1,2-bis(dicyclohexylphosphino)ethane, 1,2-bis(dimethylphosphino)ethane, 1,2-bis(diphenylphosphino)benzene, 1,4- bis(diphenylphosphino)butane, 1,2-bis(diphenylphosphino)ethylene, bis(diphenylphosphinoethyl)phenylphosphine, 1,2-bis(diphenylphosphino)ethane, trans-1,2-diaminocyclohexane, 1,2-diaminopropane, tetramethylethylenediamine, 1,1,1-tris(diphenylphosphinomethyl)ethane, ethylenediamine-N,N'-disuccinic acid (EDDS), diethylenetriaminepentaacetic acid (DTPA), hydroxyethyliminodiacetate (HEIDA), 1,2-cyclohexylenedinitrilo tetraacetic acid (CDTA), succinic acid, tartaric acid or a combination thereof.

An eighteenth aspect which is the method of any of the twelfth through seventeenth aspects wherein the organophosphorus compound is characterized by a general formula $(OR)_4P^+$[anion] where R is an alkyl group and the anion is monovalent.

A nineteenth aspect which is the method of the eighteenth aspect wherein R is a $C_1$ to $C_{20}$, a $C_1$ to $C_{10}$, or a $C_1$ to $C_5$ alkyl group.

A twentieth aspect which is the method of the eighteenth aspect wherein R is selected from the group consisting of a methyl group, an ethyl group, a propyl group, a butyl group, a pentyl group, a hexyl group, a heptyl group, and an octyl group.

A twenty-first aspect which is the method of any of the twelfth through twentieth aspects wherein the organophosphorus compound comprises tetrakis(hydroxymethyl)phosphonium sulfate (THPS), tetrakis(hydroxymethyl)phosphonium chloride (THPC), phosphonium salts, phosphonates, phosphate esters, polyphosphates, amino phosphates or a combination thereof.

A twenty-second aspect which is the method of any of the twelfth through twenty-first aspects wherein the optional enhancer comprises an amine.

A twenty-third aspect which is the method of any the twelfth through twenty-second aspects wherein the optional enhancer comprises an amino alcohol characterized by a general formula $R_2N$-OH where R can be hydrogen or an alkyl group.

A twenty-fourth aspect which is the method of any the twelfth through twenty-third aspects wherein the optional enhancer comprises monoethanolamine. aminoethylethanolamine, or a combination thereof.

A twenty-fifth aspect which is the method of any of the twelfth through twenty-fourth aspects wherein the solvent comprises an aqueous fluid.

A twenty-sixth aspect which is the method of any of the twelfth through twenty-fifth aspects wherein the surface is a wellbore formation matrix, a perforation, a tubular or other wellbore servicing equipment.

A twenty-seventh aspect which is a composition comprising contacting (i) a biochelant; (ii) an organophosphorus compound; (iii) an optional enhancer and (iv) a solvent.

A twenty-eighth aspect which is the composition of the twenty-eight aspect wherein (i) the biochelant comprises a glucose oxidation product; (ii) the organophosphorus compound comprises tetrakis(hydroxymethyl)phosphonium sulfate (THPS), tetrakis(hydroxymethyl)phosphonium chloride (THPC), phosphonium salts, or a combination thereof.

A twenty-ninth aspect which is the method of any of the twenty-seventh through twenty-eighth aspects wherein the optional enhancer comprises monoethanolamine. aminoethylethanolamine or a combination thereof.

A thirtieth aspect which is the method of any of the twenty-seventh through twenty-ninth aspects wherein the solvent comprises an aqueous fluid.

A thirty-first aspect which is a method of servicing a wellbore disposed in a subterranean formation comprising placing into the wellbore a fluid comprising a biochelant; (ii) an organophosphorus compound; (iii) an optional enhancer and (iv) a solvent for a time period sufficient to reduce a level of iron sulfide deposits by at least about 10% wherein the optional enhancer comprises an amino alcohol.

While aspects of the disclosure have been shown and described, modifications thereof can be made without departing from the spirit and teachings of the presently disclosed subject matter. The aspects and examples described herein are exemplary only and are not intended to be limiting. Many variations and modifications of the subject matter disclosed herein are possible and are within the scope of the present disclosure.

At least one aspect is disclosed and variations, combinations, and/or modifications of the aspect(s) and/or features of the aspect(s) made by a person having ordinary skill in the art are within the scope of the disclosure. Alternative aspects that result from combining, integrating, and/or omitting features of the aspect(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, 5, 6, . . . ; greater than 0.10 includes 0.11, 0.12, 0.13, 0.14, 0.15, . . . ). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the detailed description of the presently disclosed subject matter.

What is claimed is:

1. A method of reducing scale on a surface comprising one or more deposits comprising iron sulfide, the method comprising:

contacting the surface comprising the one or more deposits with a fluid comprising:

(i) one or more biochelants present in an amount from about 10 wt. % to about 40 wt. % by weight of the fluid, wherein the one or more biochelants comprise an aldonic acid, a uronic acid, an aldaric acid, a glucose oxidation product, a gluconic acid oxidation product, a glucarate, a gluconate, glucaric acid, gluconic acid, glucuronic acid, galactonic acid, galactaric acid, or a combination thereof;

(ii) one or more organophosphorus compounds present in an amount from about 10 wt. % to about 40 wt. % by weight of the fluid, wherein the organophosphorus compound is characterized by a general formula (OR)$_4$P$^+$[anion] where R is an alkyl;

(iii) an enhancing chelant present in an amount from about 5 wt. % to about 40 wt. % by weight of the fluid, wherein the enhancing chelant comprises citric acid, ethylene diamine tetraacetic acid (EDTA), nitrilotriacetic acid (NTA), hydroxyethylidene diphosphonic acid (HEDTA), methylglycine N,N-diacetic acid trisodium salt (MGDA), N,N-dicarboxymethyl glutamic acid tetrasodium salt (GLDA), 1,10-phenanthroline, acetylacetone, aminomethylphosphonic acid, benzotriazole, benzoylacetone, bipyridine, 2,2'-bipyrimidine, 1,2-bis(dicyclohexylphosphino) ethane, 1,2-bis(dimethylphosphino) ethane, 1,2-bis(diphenylphosphino) benzene, 1,4-bis(diphenylphosphino) butane, 1,2-bis(diphenylphosphino)ethylene, bis(diphenylphosphinoethyl)phenylphosphine, 1,2-bis(diphenylphosphino)ethane, trans-1,2-diaminocyclohexane, 1,2-diaminopropane, tetramethylethylenediamine, 1,1,1-tris(diphenylphosphinomethyl)ethane, ethylenediamine-N,N'-disuccinic acid (EDDS), diethylenetriaminepentaacetic acid (DTPA), hydroxyethyliminodiacetate (HEIDA), 1,2-cyclohexylenedinitrilo tetraacetic acid (CDTA), succinic acid, tartaric acid or a combination thereof; and (iv) a solvent;

wherein the one or more biochelants and the organophosphorus compound are present in a weight ratio of about 1:1.

2. The method of claim 1, wherein the one or more biochelants further comprises a counter-cation.

3. The method of claim 2, wherein the counter-cation comprises silicates, borates, aluminum, calcium, magnesium, ammonium, sodium, potassium, cesium, strontium or a combination thereof.

4. The method of claim 1, wherein R is a C$_1$ to C$_{20}$ compound.

5. The method of claim 1, wherein R is selected from the group consisting of a methyl group, an ethyl group, a propyl group, a butyl group, a pentyl group, a hexyl group, a heptyl group, and an octyl group.

6. The method of claim 1, wherein the organophosphorus compound comprises tetrakis(hydroxymethyl)phosphonium sulfate (THPS), tetrakis(hydroxymethyl)phosphonium chloride (THPC), phospho salts, phosphonates, phosphate esters, polyphosphates, amino phosphates or a combination thereof.

7. The method of claim 1, wherein the solvent comprises an aqueous fluid.

8. The method of claim 1, wherein the surface is a wellbore formation matrix, a perforation, a tubular or other wellbore servicing equipment.

9. The method of claim 1, wherein the one or more biochelants comprise a glucarate, a gluconate, glucaric acid, gluconic acid, or a combination thereof.

10. The method of claim 1, wherein the organophosphorus compound comprises tetrakis(hydroxymethyl)phosphonium sulfate (THPS), tetrakis(hydroxymethyl)phosphonium chloride (THPC), or a combination thereof.

11. The method of claim 1, wherein the one or more biochelants are present in an amount from about 20 wt. % to about 40 wt. % by weight of the fluid.

12. The method of claim 1, wherein the one or more organophosphorus compounds are present in an amount from about 10 wt. % to about 30 wt. % by weight of the fluid.

13. The method of claim 1, wherein the enhancing chelant is present in an amount from about 5 wt. % to about 20 wt. % by weight of the fluid.

14. The method of claim 1, wherein the one or more biochelants and the one or more enhancing chelants are present in a ratio of about 1:1.

15. A method of servicing a wellbore disposed in a subterranean formation, the method comprising:

placing into the wellbore a fluid comprising:

(i) a biochelant present in an amount from about 10 wt. % to about 70 wt. % by weight of the fluid, wherein the one or more biochelants comprise an aldonic acid, a uronic acid, an aldaric acid, a glucose oxidation product, a gluconic acid oxidation product, a glucarate, a gluconate, glucaric acid, gluconic acid, glucuronic acid, galactonic acid, galactaric acid, or a combination thereof;

(ii) an organophosphorus compound present in an amount from about 10 wt. % to about 70 wt. % by weight of the fluid, wherein the organophosphorus compound is characterized by a general formula (OR)$_4$P$^+$ [anion] where R is an alkyl group and the anion is monovalent;

(iii) an enhancing chelant present in an amount from about 5 wt. % to about 40 wt. % by weight of the fluid, wherein the enhancing chelant comprises citric acid, ethylene diamine tetraacetic acid (EDTA), nitrilotriacetic acid (NTA), hydroxyethylidene diphosphonic acid (HEDTA), methylglycine N,N-diacetic acid trisodium salt (MGDA), N, N-dicarboxymethyl glutamic acid tetrasodium salt (GLDA), 1,10-phenanthroline, acetylacetone, aminomethylphosphonic acid, benzotriazole, benzoylacetone, bipyridine, 2,2'-bipyrimidine, 1,2-bis(dicyclohexylphosphino) ethane, 1,2-bis(dimethylphosphino) ethane, 1,2-bis(diphenylphosphino) benzene, 1,4-bis(diphenylphosphino) butane, 1,2-bis(diphenylphosphino)ethylene, bis(diphenylphosphinoethyl)phenylphosphine, 1,2-bis(diphenylphosphino) ethane, trans-1,2-diaminocyclohexane, 1,2-diaminopropane, tetramethylethylenediamine, 1,1,1-tris(diphenylphosphinomethyl) ethane, ethylenediamine-N,N'-disuccinic acid (EDDS), diethylenetriaminepentaacetic acid (DTPA), hydroxyethyliminodiacetate (HEIDA), 1,2- cyclohexylenedinitrilo tetraacetic acid (CDTA), succinic acid, tartaric acid or a combination thereof; and (iv) a solvent;

for a time period sufficient to reduce a level of iron sulfide deposits by at least about 10%, wherein the biochelant and the organophosphorus compound are present in a weight ratio of about 1:1.

16. The method of claim 15, wherein the one or more biochelants comprise a glucarate, a gluconate, glucaric acid, gluconic acid, or a combination thereof, and wherein the organophosphorus compound comprises tetrakis(hydroxymethyl)phosphonium sulfate (THPS), tetrakis(hydroxymethyl)phosphonium chloride (THPC), or a combination thereof.

17. The method of claim 15, wherein the one or more biochelants are present in an amount from about 20 wt. % to about 40 wt. % by weight of the fluid.

18. The method of claim 15, wherein the one or more organophosphorus compounds are present in an amount from about 10 wt. % to about 30 wt. % by weight of the fluid.

19. The method of claim 15, wherein the enhancing chelant is present in an amount from about 5 wt. % to about 20 wt. % by weight of the fluid.

\* \* \* \* \*